United States Patent [19]

Keran et al.

[11] 4,337,084
[45] Jun. 29, 1982

[54] SYSTEM FOR RECYCLING CHAR IN IRON OXIDE REDUCING KILNS

[75] Inventors: Vitie P. Keran; Alan C. Baker, both of Harriman, Tenn.

[73] Assignee: The Direct Reduction Corporation, New York, N.Y.

[21] Appl. No.: 132,806

[22] Filed: Mar. 24, 1980

[51] Int. Cl.³ .............................................. C21B 13/08
[52] U.S. Cl. ......................................................... 75/36
[58] Field of Search ...................................... 75/33–38

[56] References Cited

U.S. PATENT DOCUMENTS

| | | | |
|---|---|---|---|
| 2,593,398 | 4/1952 | Kalling ................................... | 75/36 |
| 3,180,725 | 4/1965 | Meyer et al. ......................... | 75/36 X |
| 3,206,299 | 9/1965 | Senior et al. ............................ | 75/34 |
| 3,890,138 | 6/1975 | Hockin ................................ | 75/36 X |

*Primary Examiner*—M. J. Andrews

*Attorney, Agent, or Firm*—Cooper, Dunham, Clark, Griffin & Moran

[57] ABSTRACT

A method and means for improving the efficiency of the process for directly reducing ore containing iron oxide in a rotary kiln using a solid carbonaceous reducing agent, such as coal, introduced from the ore feed and discharge ends of the kiln, as both fuel and reductant, is disclosed wherein the charred coal or char found in the discharge product is recycled into the process at the discharge end of the kiln rather than the feed end as in the prior art. In particular, the recovered char, both coarse and finer particles, are transported to a recycle bin from which they are returned at a preselected rate to the kiln process by being injected along with the coal blown into the discharge end of the kiln. Alternatively, the recycle char alone may be fed without any coal at the discharge end of the kiln.

11 Claims, 2 Drawing Figures

PRIOR ART

SYSTEM FOR RECYCLING CHAR IN IRON OXIDE REDUCING KILNS

BACKGROUND OF THE INVENTION

The present invention relates to a process for directly reducing ore containing iron oxide in a rotary kiln using a solid, carbonaceous material, such as coal, as both fuel and reductant and, more particularly, to a method and means for recycling char to the kiln in an improved manner.

Many different methods have been suggested and used for carrying out the direct reduction of ores containing iron oxide using carbonaceous materials, particularly coal, as both the heating agent and reductant in a rotary kiln. For example, in some of these processes the coal is fed into the kiln through the discharge end by mechanical or pneumatic means, such as respectively disclosed in U.S. Pat. No. 3,113,859 to Moklebust and U.S. Pat. No. 3,505,060 to Heitmann, and in some it is fed at the center of or along the kiln, such as disclosed in U.S. Pat. No. 3,206,299 to Senior et al. However, considerable problems have been encountered with these various approaches, many of which problems have been overcome by the process disclosed in U.S. Pat. No. 3,890,138 to Hockin. In this latter process a portion of the coal is injected or blown from the discharge end of the kiln, and the remaining portion of the coal is fed with the ore at the charge feed end. The kiln is generally divided into a reducing zone toward the discharge end and a preheat zone toward the feed end, and the coal is distributed in the kiln in such a manner that the amount of coal injected from the discharge end is sufficient to aid in controlling the temperature profile throughout both zones of the kiln.

Although the process of Hockin was developed particularly for use in reducing ilmenite, it has been found that the dual end coal feeding technique improves upon the other coal feeding methods used in reducing iron ore to sponge iron in rotary kilns with the direct reduction process, and the present invention relates to improvements in this latter process when dual end coal feeding is used.

It has been the practice in the art when directly reducing iron ores to sponge iron in a rotary kiln using coal as the reductant, to recover and recycle the charred coal found in the discharge product. This charred coal or char is separated from the metallized portion of the product and collected in a char recycle bin from which it is fed at a selected rate into the feed end of the kiln along with the coal and ore. A problem is properly feeding the char at the feed end of the kiln is presented by a combination of the low bulk density of specific gravity of the char particles and the considerable velocity of the exhaust gases from the kiln which may range in magnitude from 10 to 50 feet per second. Under these conditions much of the light and small particle size recycle char will be carried off into the waste gas system, and although again recovered and recycled from the waste gas, much of the char may be continuously reintroduced at the feed end, ground down, and eventually lost from the process into the waste gas system. Of course, the more char that can be effectively recycled, the less coal need be supplied to run the process, and thus char recycling is important to process efficiency.

The present invention describes an improvement in the process of this general type, particularly directed to reducing ore containing iron oxide, wherein the char recovered from the discharge product is recycled to the kiln by being injected into the discharge end of the kiln with or without blown coal.

SUMMARY OF THE INVENTION

The present invention is directed to efficiently operating a rotary kiln directly reducing iron ore using coal fed into its opposite ends as both the fuel and reductant and involves the feeding of recycle char, recovered from the discharge product of the rotary kiln, back into the kiln at the discharge end along with blown coal. In such kilns the ore and a portion of the coal are introduced at the feed end, and the remainder of the coal is injected from the discharge end with air also being injected at spaced intervals along the kiln to promote combustion. The charge near the feed end is preheated over a zone extending for about a third of the kiln length, and reduction occurs in the bed for the remainder of the length. The invention takes advantage of the fact that, firstly, the velocity of the gases at the discharge end of such a kiln is much lower than that of the exhaust gas at the feed end, and thus prior art feed end losses of fine char are avoided, and further that returning the char directly to the bed in the reducing zone at the discharge end avoids problems that occur with the char in the preheat zone, resulting from it being ground into fines and chemically altered before reaching the reducing zone.

The rates of feeding of the char and the coal for injection into the discharge end may be appropriately adjusted to an optimum continuous condition, and it has been found that with this technique the feed end coal requirement can be reduced by as much as 15 to 20%, thus considerably improving the efficiency of the entire direct reduction process. Contributing to this efficiency is the fact that not only the coarse char recovered from the discharge product, but also finer char which may be recovered from the product waste may be recycled in this manner. Alternatively, the recycle char alone may be fed without any coal at the discharge end of the kiln.

DETAILED DESCRIPTION OF THE PREFERRED EMBODIMENT

Figure 1:
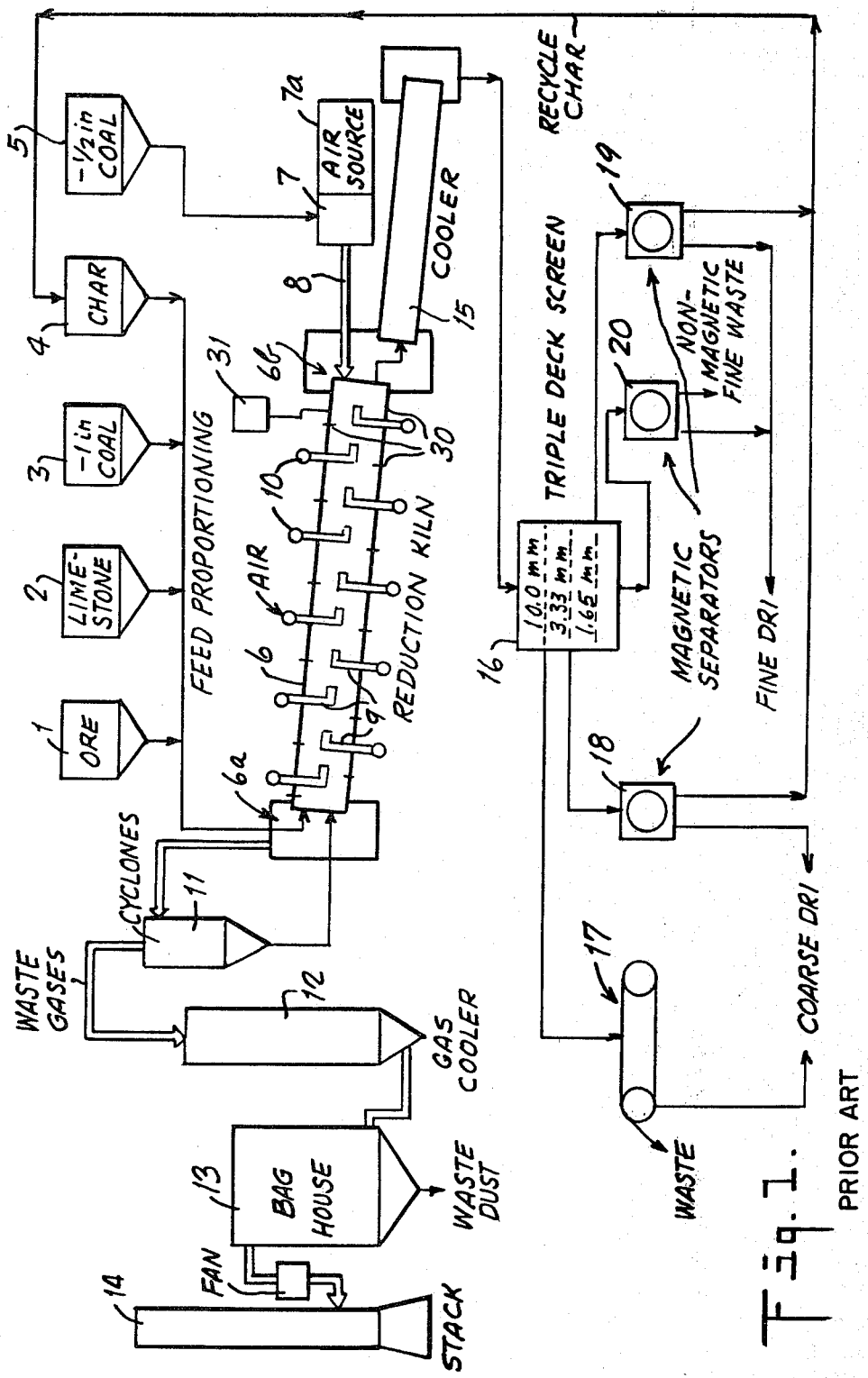
FIG. 1 is a diagrammatic view of a direct reduction plant utilizing a rotary kiln for the production of sponge iron and generally illustrating the process of the prior art.

A flow diagram of a direct reduction plant for the production of sponge iron, of the type utilizing a rotary kiln operated generally in the manner disclosed by Hockin in U.S. Pat. No. 3,890,138 is shown in FIG. 1. The plant comprises an array of feed bins respectively including: a bin 1 for supplying ore, typically in the form of iron oxide pellets or natural lump ore; a bin 2 for providing limestone or dolomite for sulfur control; a bin 3 for providing a suitable carbonaceous reducing agent, typically in the form of coal of less than 1 inch nominal diameter particles; and a bin 4 for supplying recycle char. the iron ore, coal, return or recycle char, and dolomite or limestone are accurately proportioned and fed continuously as a charge to the feed end 6a of the reduction kiln 6. A remaining bin 5 supplies coal, typically of less than ½ inch nominal diameter particles to the discharge end 6b of the rotary kiln 6, where carefully controlled quantities are injected or blown in. The coal is fed to a fireman device 7 from which it is blown by means of low pressure carrier air from a suitable source 7a, through a coal injection pipe 8 which can be adjusted to achieve the optimum trajectory for this coal. A suitable system for the blowing and adjusting is disclosed in co-pending application Ser. No. 082,138.

The reduction kiln 6 may be typically 11.5 feet (3.5 meters) in outside shell diameter and 148 feet (45 meters) long, sloped at 3%. It may be supported on two tires and driven by a 200 horsepower variable speed D.C. motor and lined with 8 inches of refractory brick or preferably castable refractory.

In addition to the introduction of carrier air through pipe 8, the kiln is equipped with a series of shell mounted air injection tubes 9 which are spaced along its length and extend into the interior of the kiln for drawing air from the outside and injecting it along the kiln axis to enhance combustion. Each of the tubes 9 is equipped with its own fan and motor combination 10 so that the rate of injection may be properly regulated at spaced positions along the kiln. Also, spaced along the kiln are twelve thermocouples 30 which measure the average temperature of the charge in the kiln and of the gas.

The hot waste or off-gases exhaust from the feed end 6a of the kiln and pass into an off-gas processing or cleaning system. In a suitable cleaning system the gases may be passed first to twin refractory-lined scalping cyclones 11, which remove and recycle coarse dust and then to a 57 feet high by 11.5 feet inside diameter spray cooling tower 12 where they may be cooled to 500° F. before passing to an 8-cell bag house 13 equipped with glass fiber bags for removing the fine dust. The cleaned gases may exit via an induced draft fan and a 100 feet high stack 14.

The material discharged from the discharge end 6b of reduction kiln 6 by means of a sealed transfer chute consists of a mixture of sponge iron, coal char, coal ash and desulfurizing agent. This material is cooled in a rotary cooler 15 which is sealed from the ambient atmosphere, fitted with lifters, and cooled externally with water. The cooled mixture is then passed from the cooler 15 to a screening system 16 and screened. The two oversized fractions are subject to magnetic separation in respective magnetic separators 17 and 18, and the remaining fines are magnetically separated in separators 19 and 20. Separators 17 and 18 remove the coarse sponge iron to the product load out area. The nonmagnetic fractions from the separators 18 and 19 are conveyed to the return char bin 4. This separation system then yields coarse and fine sponge iron, recycling char and fine nonmagnetic waste.

In a plant such as shown and described in connection with FIG. 1, with proper control of combustion conditions over the kiln bed and reduction conditions in the bed, high rates of heat transfer and optimum utilization of kiln volume, with metallization consistently in a 90%–95% range, can be achieved.

Regarding the process itself, directly reducing iron oxides in the rotary kiln using solid carbonaceous material derived from coal as the source of heat and reductant involves complex gas/solid reaction mechanisms. Overall reduction kinetics are affected by bed temperature, solids particle size, carbon/iron oxide ratio in the bed, reactivity of the char produced from the coal, the effect of catalysts on char reactivity, and reducibility of the iron oxide. Control of the rate of heat transfer to the bed and control of bed temperature are critical parameters for steady operation of the kiln so that stable process chemistry and kinetics result.

The properties of the coal and char used in the process are a fundamental consideration in the design and metallurgical performance of direct reduction kilns. Physical losses of fixed carbon or char from the process occur in the baghouse dust, and the fine char in the nonmagnetic fine waste from the screening and separation system. These losses are largely dependent on the char strength. In addition, to maintain the correct carbon level in the kiln discharge, the char must have sufficient strength to resist complete degradation in passing through the kiln. Degradation of the char in moving from the feed end to the discharge end in the kiln bed may occur to such an extent that the total coal feed rate must be increased to compensate for fine char losses, and thus a relatively high fixed carbon consumption per unit weight of iron fed may result.

Now it will be seen in FIG. 1 that the char from the return char bin 4 in the prior art was fed along with the ore, coal and dolomite or limestone, as the charge to the feed end 6a of the reduction kiln 6. However, as previously explained, the high velocity of the exhaust gases from the feed end, ranging in magnitude from 10 to 50 feet per second, tend to carry off the lighter and small particle size recycle char into the waste gas system, and although they may again be recycled from the waste gas cyclones 11, a continuous recycling of a portion of the char at the feed end will tend to occur. Further, a degradation of the char in passing through the kiln results in fine char being discharged at the discharge end, which becomes fine waste.

Figure 2:
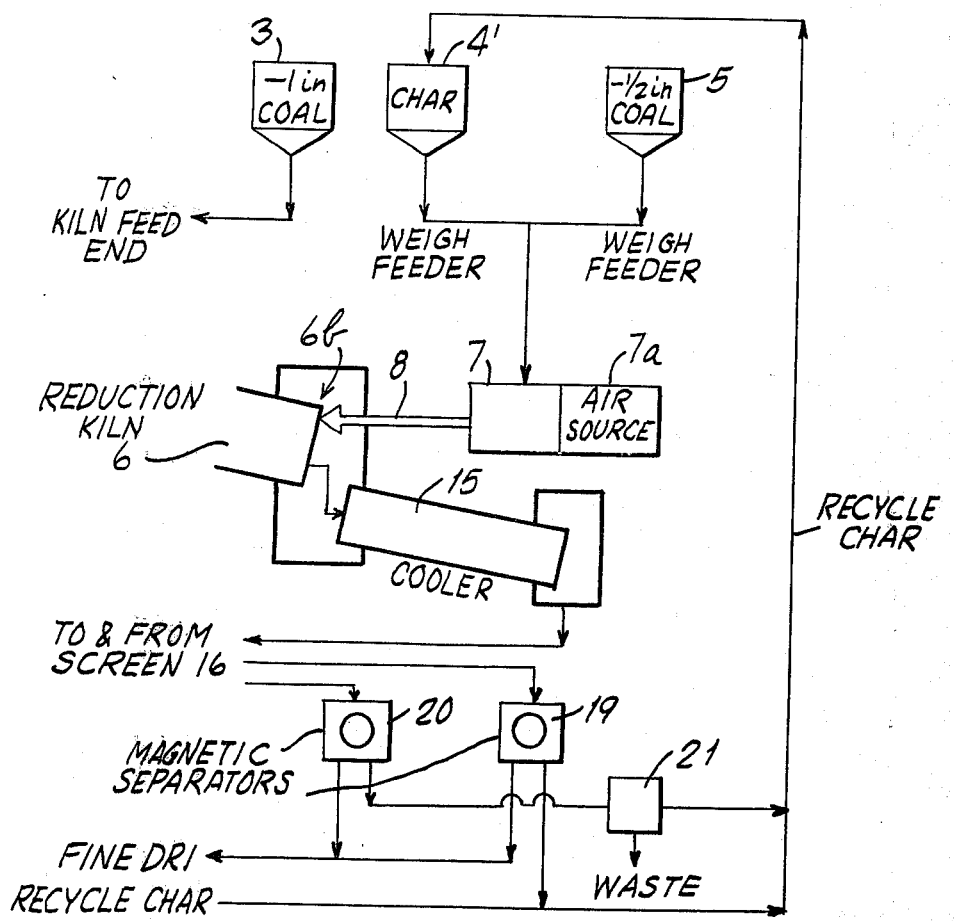
FIG. 2 is a diagrammatic view of a part of the direct reduction plant shown in FIG. 1 and illustrating the modifications in accordance with the present invention.

In accordance with the present invention, the prior art plant of FIG. 1 may be modified for improved operation in the manner shown in FIG. 2, that is, the char in the discharge product is recycled by being injected with the blown coal into the discharge end 6b of the kiln 6. More particularly, the nonmagnetic fractions separated by the separators 18 and 19 from the discharge product constitute the recycle char and are conveyed to the recycle char bin 4'. In addition, further separation may be carried out on the waste from separator 20 by a suitable fine separator means 21 and the separated fine char included in the char conveyed to the recycle bin 4'.

The char in the recycle storage bin 4' may then be fed from the bin to the discharge end of the kiln and separately injected therein with or without the blown coal. In the latter instance all of the coal would be fed at the feed end. Preferably, however, the char is mixed with the coal fed from bin 5 prior to being fed to the fireman device 7. The char thus mixed is injected or blown along with the discharge end coal into the kiln through the discharge end. The rates of feeding of the char and the blown coal may both be appropriately adjusted by control of their respective weigh feeders to achieve a proper mixture for optimum continuous operation. Suitable rates of feeding to achieve optimum process conditions will be readily determined by those skilled in the art in accordance with the various grades of coal used as the fuel and reductant. In any event whether the char is fed alone, separately with the blown coal, or mixed with the blown coal into the discharge end of the kiln, the rate of feeding of the char should be accurately controlled and proportioned by adjustment of the char weigh feeder.

It has accordingly been found that such recycling of the char into the discharge end of the kiln significantly improves the efficiency of the reduction process. Firstly, a much greater percentage of the recycled char is consumed in the reducing process, so that less coal is needed to properly run the kiln. A further contribution to improving efficiency results from the fact that the lower gas velocities at the discharge end of the kiln permit much finer char to be fed into the discharge end than at the feed end, so that finer char previously wasted may now be recovered, along with the coarser char from the product waste, and recycled. Additionally, returning the char directly to the bed in the reducing zone avoids the problems that occur in the preheat zone resulting from the char being ground into fines and chemically altered before reaching the reducing zone.

What is claimed is:

1. In the process for reducing materials containing iron oxides using a solid carbonaceous reducing agent as the source of reductant and fuel in a rotary kiln wherein part of said reducing agent is added from the discharge end and the remainder of said reducing agent is added at the feed end, and wherein the charred reducing agent is removed from the kiln discharge product and recycled, the improvement comprising the steps of:
   returning the recycled charred reducing agent to the discharge end of the kiln; and
   injecting said charred reducing agent into the kiln through the discharge end for deposition on the charge bed.

2. In the process of claim 1 wherein said part of said reducing agent added at the discharge end is pneumatically blown into the kiln and the recycled charred reducing agent is mixed with the blown part of the reducing agent when being fed to the kiln.

3. In the process of claim 2 wherein the rates of feeding of the discharge end part of the reducing agent and the recycled charred reducing agent into the mixture to be blown into the kiln are determined by the quality of the solid carbonaceous reducing agent being used in the process.

4. In the process of claim 1 wherein both coarse and fine charred reducing agent recovered from the kiln discharge product are recycled and returned to the kiln by injection through the discharge end.

5. In the process for directly reducing materials, such as ore, containing iron oxides using a solid carbonaceous material as the source of reductant and fuel in a rotary kiln having a feed end for receiving the ore and at least a portion of said carbonaceous material therethrough and a discharge end for discharging the product therefrom and wherein the charred reductant is removed from the discharge product and recycled, the steps comprising:
   removing the charred reductant from the solid materials discharged from the kiln and collecting it at a receiving location;
   conveying the collected charred reductant from said receiving location at a controlled rate to the discharge end of the kiln; and
   returning the charred reductant to the kiln by injecting it through the discharge end onto the charge bed.

6. A process as in claim 5 wherein all of the solid carbonaceous material is fed with the ore at the feed end and all of the charred reductant is fed through the discharge end.

7. A process as in claim 5 wherein the charred reductant is mixed with and blown along with a portion of the solid carbonaceous material through the discharge end of the kiln.

8. In the process of claim 5 wherein both coarse and fine charred reductant are returned to the kiln by injection through the discharge end.

9. Method of reducing iron oxides to sponge iron using a solid carbonaceous reducing agent comprising the steps of:
   feeding material containing iron oxide to be reduced and at least a portion of the solid carbonaceous reducing agent into the feed end of a rotary kiln in which the solid carbonaceous reducing agent acts as the source of fuel and reductant to reduce the iron oxide;
   collecting the solid materials discharged from the discharge end of the kiln and separating out the charred reducing agent; and
   returning the charred reducing agent to the kiln by feeding it through the discharge end onto the charge bed.

10. Method as in claim 9 wherein the charred reducing agent is returned to the kiln by being blown onto the charge bed.

11. Method as in claim 9 wherein both the coarse and the fine charred reducing agent are separated out and returned to the kiln.

* * * * *